(12) United States Patent
Song et al.

(10) Patent No.: US 12,222,533 B1
(45) Date of Patent: Feb. 11, 2025

(54) OPTICAL WAVEGUIDE DEVICE AND DISPLAY DEVICE

(71) Applicant: UPHOTON TECHNOLOGY (Beijing) CO. LTD., Beijing (CN)

(72) Inventors: Yuming Song, Beijing (CN); Zhentao Fan, Beijing (CN); Lei Sui, Beijing (CN); Kehan Tian, Beijing (CN)

(73) Assignee: UPHOTON TECHNOLOGY (Beijing) CO., LTD., Beijing (CN)

( * ) Notice: Subject to any disclaimer, the term of this patent is extended or adjusted under 35 U.S.C. 154(b) by 0 days.

(21) Appl. No.: 18/798,945

(22) Filed: Aug. 9, 2024

(30) Foreign Application Priority Data

Dec. 15, 2023 (CN) .......................... 202311725465.9

(51) Int. Cl.
*F21V 8/00* (2006.01)
*G02B 27/01* (2006.01)

(52) U.S. Cl.
CPC ......... *G02B 6/0016* (2013.01); *G02B 6/0018* (2013.01); *G02B 6/0036* (2013.01); *G02B 27/0172* (2013.01)

(58) Field of Classification Search
None
See application file for complete search history.

(56) References Cited

U.S. PATENT DOCUMENTS

| 2017/0131551 A1* | 5/2017 | Robbins | G02F 1/13439 |
| 2018/0113309 A1* | 4/2018 | Robbins | H04N 13/337 |

(Continued)

FOREIGN PATENT DOCUMENTS

| CN | 109765721 A | 5/2019 |
| CN | 110471185 A | 11/2019 |

(Continued)

OTHER PUBLICATIONS

Liu, A. et al., "Realization and Optimization of Holographic Waveguide Display System", Acta Optica Sinica, vol. 37, No. 5, (May 2017) doi: 10.3788/AOS201737.0523003, English abstract. Cited in Chinese Decision to Grant.

(Continued)

*Primary Examiner* — Jerry Rahll
(74) *Attorney, Agent, or Firm* — Renner, Kenner, Greive, Bobak, Taylor & Weber

(57) ABSTRACT

An optical waveguide device and a display device are provided. The optical waveguide device includes a waveguide substrate having a coupling-out region and first and second surfaces with coupling-in and reflection regions, a coupling-in grating disposed in the coupling-in region to diffract input light to form positive first-order and zero-order diffraction light, a coupling-out grating disposed and a reflection grating disposed in the reflection region such that portion of the zero-order diffraction light forms positive first-order reflection light through diffraction. A light spot of the zero-order diffraction light first projected onto the second surface has a first profile at least partially located in the reflection region. A projection of the reflection region on the first surface partially overlaps with the coupling-in region, and a ratio of area of an overlapping portion to that of the coupling-in region is less than or equal to 40%.

20 Claims, 8 Drawing Sheets

(56) References Cited

U.S. PATENT DOCUMENTS

| | | | | |
|---|---|---|---|---|
| 2019/0146221 A1* | 5/2019 | Oku | ................... | G02B 27/0172 |
| | | | | 359/13 |
| 2020/0341280 A1 | 10/2020 | Bablumyan et al. | | |
| 2021/0063765 A1* | 3/2021 | Yang | ................... | H04N 13/337 |
| 2021/0064082 A1* | 3/2021 | Yang | ................... | G02B 27/283 |

FOREIGN PATENT DOCUMENTS

| | | | |
|---|---|---|---|
| CN | 113970847 A | 1/2022 |
| CN | 217766905 U | 11/2022 |
| CN | 115480334 A | 12/2022 |
| CN | 218068340 U | 12/2022 |
| CN | 218788101 U | 4/2023 |
| WO | 2022060733 A1 | 3/2022 |

OTHER PUBLICATIONS

Chinese Patent Office Decision to Grant of priority Chinese patent application No. 2023117254659 and English translation thereof.

\* cited by examiner

OPTICAL WAVEGUIDE DEVICE AND DISPLAY DEVICE

CROSS-REFERENCE TO RELATED APPLICATION

The present disclosure claims priority to Chinese Patent Application No. 202311725465.9, filed on Dec. 12, 2023, which is hereby incorporated by reference in its entirety.

BACKGROUND

The present disclosure generally relates to the technical field of optics, and more specifically to an optical waveguide device and a display device.

Optical waveguide devices have the advantages of lightness and thinness, easy replication, and high processing yield and the like. Compared with the low processing yield of array optical waveguides and the difficulty in mass production of holographic waveguides, optical waveguide devices with surface relief are an ideal solution for consumer electronics waveguide glasses. In the optical waveguide device, whether it is a one-dimensional turning type pupil expansion optical waveguide device, a butterfly type pupil expansion optical waveguide device, or a two-dimensional pupil expansion optical waveguide device, the coupling-in efficiency of a coupling-in grating, which is the source for introducing the entire light-emitting device into the waveguide, plays a vital role in the overall efficiency of the entire waveguide.

However, due to the need to adapt to the aperture of the light-emitting device and other reasons, the size of the coupling-in region is generally larger, and due to the current general demand for lightness and thinness, the thickness of the lens is thinner, and the coupling-in +1 order will hit on the coupling-in grating and on the substrate on the other side of the coupling-in grating for many times. Due to the large number of reflections in a dense field of view, its coupling efficiency is usually lower than that in a sparse field of view. Moreover, on the other side of the transmissive coupling-in grating, there will be a separate region between the coupling-in zero-order and the coupling-in +1 order. This part of the coupling-in zero-order light is also a part of the dense field of view, but the zero-order light will propagate in the direction away from the coupling-out grating, such that a lot of energy is wasted. Taken together, there is a high probability of darkening the dense field of view.

Therefore, it is necessary to improve the optical waveguide device and the display device to solve at least one technical problem.

SUMMARY

The present disclosure is proposed in order to solve at least one of the above problems. Specifically, a first aspect of the present disclosure provides an optical waveguide device, comprising:

a waveguide substrate having a first surface with a coupling-in region and an opposite second surface with a reflecting region, and further having a coupling-out region;

a coupling-in grating disposed in the coupling-in region of the first surface of the waveguide substrate and configured to receive input light within a predetermined field of view, diffract at least a portion of the input light to form positive first-order diffraction light and zero-order diffraction light, and couple the light into the waveguide substrate, such that the light can propagate within the waveguide substrate through total reflection, wherein a light spot of the zero-order diffraction light first projected onto the second surface has a first profile, and the first profile is at least partially located in the reflection region;

a coupling-out grating disposed in the coupling-out region of the waveguide substrate and configured to couple at least a portion of the light propagating into the coupling-out grating out of the waveguide substrate through diffraction;

a reflection grating disposed in the reflection region of the second surface and configured such that a portion of the zero-order diffraction light forms positive first-order reflection light through diffraction and the positive first-order reflection light is propagated to the coupling-out grating through total reflection in the waveguide substrate;

wherein a projection of the reflection region on the first surface at least partially overlaps with the coupling-in region, and a ratio of an area of an overlapping portion to an area of the coupling-in region is less than or equal to 40%.

The optical waveguide device according to the present disclosure utilizes the energy of the zero-order diffraction light with the reflection grating and improves the coupling-in efficiency of the dense field of view, thereby increasing the coupling-out brightness of the dense field of view and improving the uniformity of the overall field of view.

Optionally, the ratio of the area of the overlapping portion to the area of the coupling-in region is less than or equal to 20%.

Optionally, an incident angle of the positive first-order reflection light on the first surface and/or the second surface is equal to an incident angle of the positive first-order diffraction light on the first surface and/or the second surface.

Optionally, a projection of the reflection grating on the first surface is located within the range of the coupling-in region.

Optionally, the reflection grating comprises a first part and a second part, a projection of the first part on the first surface is located within the range of the coupling-in region, a projection of the second part on the first surface is located outside the range of the coupling-in region, and a length of the second part along a first direction is less than or equal to twice a length of the first part along the first direction.

Optionally, a light spot of the positive first-order diffraction light first projected onto the second surface has a second profile, and an area of the second profile located in the reflection region is less than or equal to 20% of an area of the second profile.

Optionally, the second profile is located outside the reflection region.

Optionally, the first profile partially overlaps with the second profile such that the first profile comprises a non-overlapping region and an overlapping region, wherein the non-overlapping region is located within the reflection region.

Optionally, the first profile and the second profile are circles with a diameter D or ellipses with a minor axis D, and the waveguide substrate has a thickness of L;

wherein when L is 0.5 mm<L≤0.75 mm, a ratio of an area of the overlapping region to an area of the first profile and/or the second profile is less than or equal to 80%.

Optionally, a distance from a geometric center of the second profile to a side of the reflection grating closest to the geometric center is greater than (D/2)×0.8.

Optionally, when L is 0.75 mm<L≤1.0 mm, a ratio of an area of the overlapping region to an area of the first profile and/or the second profile is less than 75%.

Optionally, a distance from a geometric center of the second profile to a side of the reflection grating closest to the geometric center is greater than (D/2)×0.72.

Optionally, when L is 1.0 mm<L≤1.5 mm, a ratio of an area of the overlapping region to an area of the first profile and/or the second profile is less than 70%.

Optionally, a distance from a geometric center of the second profile to a side of the reflection grating closest to the geometric center is greater than (D/2)×0.65.

Optionally, when L is 1.5 mm<L≤2.0 mm, a ratio of an area of the overlapping region to an area of the first profile and/or the second profile is less than 65%.

Optionally, a distance from a geometric center of the second profile to a side of the reflection grating closest to the geometric center is greater than (D/2)×0.5.

Optionally, the waveguide substrate has a first refractive index $n_1$, and the coupling-in grating has a second refractive index $n_2$, where $0 \leq n_2 - n_1 \leq 0.4$.

Optionally, $0 \leq n_2 - n_1 \leq 0.2$.

Optionally, an area of the coupling-in region is less than or equal to 144 mm²; and/or
a shape of the coupling-in region is circular, elliptical, square or rectangular.

Optionally, the area of the coupling-in region is less than or equal to 64 mm².

Optionally, the coupling-in grating and the reflection grating have the same period; and/or
the coupling-in grating and the reflection grating have different duty cycles.

Optionally, a coupling efficiency of the reflection grating to the positive first-order diffraction light is greater than a coupling efficiency of the coupling-in grating to the input light.

A second aspect of the present disclosure provides a display device, comprising:
the optical waveguide device of the first aspect; and
a light-emitting device configured to emit input light within a predetermined field of view to a coupling-in grating of the optical waveguide device.

Optionally, a value of the predetermined field of view along a first direction is V, a value of the predetermined field of view along a second direction is H, the second direction is orthogonal to the first direction, and a plane formed by intersection of the first direction and the second direction is substantially parallel to the first surface;
an included angle between an optical axis of the light-emitting device and the first direction is α, and an included angle between the optical axis of the light-emitting device and the second direction is β;
a sampling interval along the first direction is h, a sampling interval along the second direction is v, the number of sampling points is c, H=c×h, and V=c×v;
wherein a light ray of a light spot of the input light projected onto the first surface at an edge vertex along the first direction and the first surface have an included angle of $k_1 \times h + a$, where $0 < k_1 < c$;
a light ray of the light spot of the input light projected onto the first surface at an edge vertex along the second direction and the first surface have an included angle of $k_2 \times v + \beta$, where $0 < k_2 < c$; and a shape of the light spot can be adjusted by adjusting values of $k_1$ and $k_2$.

BRIEF DESCRIPTION OF THE DRAWINGS

In order to illustrate the technical solutions in the embodiments of the present disclosure more clearly, the following will briefly introduce the drawings that need to be used in the description of the embodiments. Obviously, the drawings described in the following are only some embodiments of the present disclosure. For those of ordinary skilled in the art, other drawings can also be obtained from these drawings without creative work.

EXPLANATION OF REFERENCE NUMERALS

Figure 1:
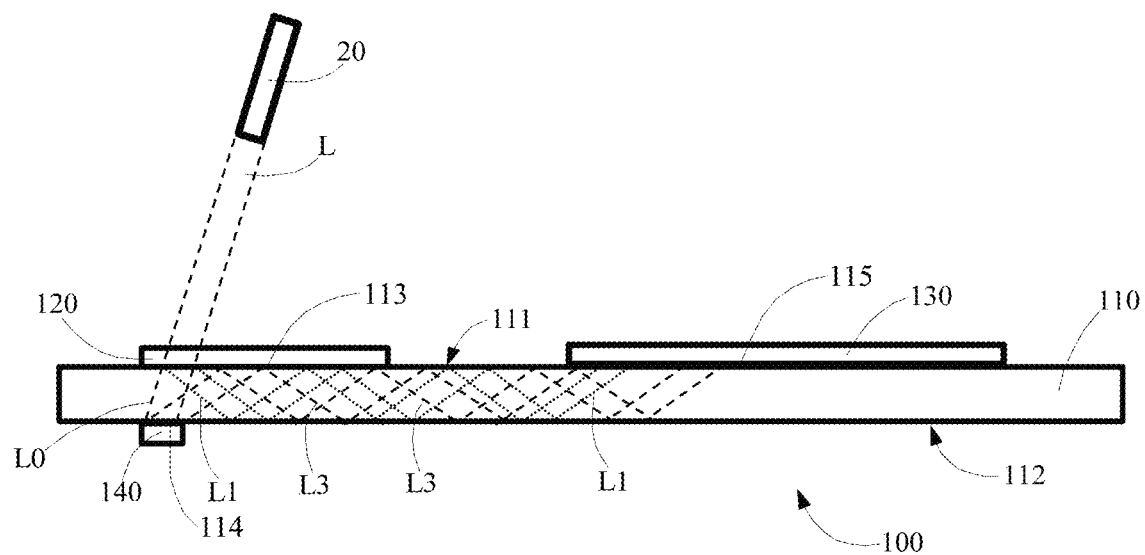
FIG. 1 shows a schematic side view of an optical waveguide device according to an embodiment of the present disclosure.

10: Display device 20: Light-emitting device AX: Optical axis
30: Lens 40: Frame 100: Optical waveguide device
110: Waveguide substrate 111: First surface 112: Second surface
120: Coupling-in grating 130: Coupling-out grating 140: Reflection grating
141: Main body portion 142: Extension portions P1: First profile
P2: Second profile S1: Overlapping region S2: Non-overlapping region L: Input light L0: Zero-order diffraction light L1: Positive first-order diffraction light D1: First direction D2: Second direction L3: Positive first-order reflection light 143: First part 144: Second part

DETAILED DESCRIPTION

In order to make the objects, technical solutions and advantages of the present disclosure more apparent, the exemplary embodiments according to the present disclosure will be described in detail below with reference to the accompanying drawings. Obviously, the described embodiments are only a part of the embodiments of the present disclosure, rather than all of the embodiments of the present disclosure, and it should be understood that the present disclosure is not limited by the exemplary embodiments described herein. Based on the embodiments of the present disclosure described herein, all other embodiments obtained by those skilled in the art without creative work shall fall within the protection scope of the present disclosure.

In the following description, numerous specific details are set forth in order to provide a more thorough understanding of the present disclosure. However, it is obvious to those skilled in the art that the present disclosure may be implemented without one or more of these details. Some technical features well-known in this art are not described in other examples in order to avoid confusion with the present disclosure.

It should be understood that the present disclosure may be implemented in various forms, and should not be construed as being limited to the embodiments set forth herein. On the contrary, these embodiments are provided so that the disclosure will be thorough and complete and will fully convey the scope of the disclosure to those skilled in the art.

The terms used herein is for the purpose of describing the particular embodiments and is not intended to limit the disclosure. As used herein, the terms "a", "an" and "the" in the singular form are also intended to include the plural form, unless otherwise indicated herein. It should still be understood that the terms "comprising" and/or "including" and their derivatives are used in the description to specify the presence of the stated features, integers, steps, operations, elements and/or components but not to exclude the presence or addition of one or more other features, integers, steps, operations, elements, components and/or groups. As used herein, the terms "and/or" include any or all combinations of related listed items.

In order to understand the present disclosure thoroughly, a detailed structure is provided in the following description so as to elucidate the technical solutions presented in the present disclosure. Alternative embodiments of the present disclosure are described in detail as below. However, the present disclosure may further have other embodiments in addition to these detailed descriptions.

In order to solve the aforementioned technical problem, a first aspect of the present disclosure provides an optical waveguide device 100 including a waveguide substrate 110, a coupling-in grating 120, a coupling-out grating 130 and a reflection grating 140.

The waveguide substrate 110 has a first surface 111 with a coupling-in region 113 and an opposite second surface 112 with a reflection region 114. The waveguide substrate 110 further has a coupling-out region 115. The coupling-in grating 120 is disposed in the coupling-in region 113 of the first surface 111 of the waveguide substrate 110 and configured to receive input light L within a predetermined field of view, diffract at least a portion of the input light L to form positive first-order diffraction light L1 and zero-order diffraction light L0, and couple the light into the waveguide substrate 110, such that the light can propagate within the waveguide substrate 110 through total reflection, wherein a light spot of the zero-order diffraction light L0 first projected onto the second surface 112 has a first profile P1, and the first profile P1 is at least partially located in the reflection region 114. The coupling-out grating 130 is disposed in the coupling-out region 115 of the waveguide substrate 110 and configured to couple at least a portion of the light propagating into the coupling-out grating 130 out of the waveguide substrate 110 through diffraction. The reflection grating 140 is disposed in the reflection region 114 of the second surface 112 and configured such that a portion of the zero-order diffraction light L0 forms positive first-order reflection light L3 through diffraction and the positive first-order reflection light L3 is propagated to the coupling-out grating 130 through total reflection in the waveguide substrate 110.

Wherein a projection of the reflection region 114 on the first surface 111 at least partially overlaps with the coupling-in region 113, and a ratio of an area of an overlapping portion to an area of the coupling-in region 113 is less than or equal to 40%.

The optical waveguide device according to the present disclosure utilizes the energy of the zero-order diffraction light with the reflection grating, thereby improving the coupling-in efficiency of the dense field of view, further increasing the coupling-out brightness of the dense field of view and improving the uniformity of the overall field of view.

The optical waveguide device 100 of the present disclosure will be described below with reference to FIGS. 1 to 8C. The features of the various embodiments of the present disclosure may be combined with each other without conflict.

The present disclosure provides an optical waveguide device 100 including a waveguide substrate 110. The shape of the waveguide substrate 110 may be any suitable shape, for example, a rectangle, a dumbbell shape, a butterfly shape, or the like. The waveguide substrate 110 may be made of glass, optical plastic, or other optical transmission materials. The waveguide substrate 110 may have a first surface 111 and a second surface 112 that are substantially flat, wherein the first surface 111 is opposite to the second surface 112. The first surface 111 may refer to the surface of the display device 10 with the waveguide substrate 110 on the side facing the viewer's eyes. With the waveguide substrate 110, light may propagate in a direction substantially parallel to the first surface 111 and the second surface 112 through total internal reflection.

The optical waveguide device 100 of the present disclosure further comprises a coupling-in grating 120 and a coupling-out grating 130. The waveguide substrate 110 has a coupling-in region 113 and a coupling-out region 115. The coupling-in grating 120 is disposed on or in the waveguide substrate 110 and located in the coupling-in region 113, and is configured to diffract at least a portion of the input light L to form positive first-order diffraction light L1 and zero-order diffraction light L0 and couple the light into the waveguide substrate 110 to cause it to propagate within the waveguide substrate 110.

The coupling-out grating 130 is disposed on or in the waveguide substrate 110 and located in the coupling-out region 115. The coupling-out grating 130 is used to couple at least a portion of the light propagating therein out of the waveguide substrate 110 by diffraction so that the coupling-out light may be received by the viewer's eyes.

The coupling-in grating 120 may be a one-dimensional grating, such as a linear grating (also referred to as a straight-tooth grating), or may be an oblique-tooth grating, a non-blazed grating, and other suitable types of gratings, or the coupling-in grating 120 may also be a metasurface coupling-in structure. In some examples, the coupling-in grating 120 is a one-dimensional grating, a two-dimensional grating, or is formed by splicing two gratings with different grating vectors. The coupling-in grating 120 may be an optical element including a periodic structure, which may be fabricated by any suitable microfabrication process. For example, the grating may be fabricated on the surface or inside of the waveguide substrate 110 by photolithography or on the waveguide substrate 110 by nanoimprint lithography, thereby forming a surface relief diffraction grating.

The coupling-out grating 130 may be fabricated by any suitable microfabrication process. For example, the grating may be fabricated on the surface or inside of the waveguide substrate 110 by photolithography or on the waveguide substrate 110 by nanoimprint lithography, thereby forming a surface relief diffraction grating. It is worth mentioning that various shapes of gratings shown in this disclosure are the shapes on the top surfaces of the gratings parallel to the surface of the optical waveguide (i.e., the surface on which the coupling-out grating 130 or the coupling-in grating 120 is disposed), the shapes may be cross-sectional shapes taken in a plane substantially parallel to the surface of the optical waveguide, or may be projection shapes on a plane parallel to the surface of the optical waveguide.

When the light entering the coupling-in grating 120 is, for example, image light projected by a projector, the light coupled out from the coupling-out grating 130 is at least a portion of the image light, and the portion of the image light is guided to the viewer's eyes through the coupling-out grating 130 so that the image projected by the projector is visible to the viewer's eyes. Wherein, the coupling-out grating 130 plays the role of pupil expansion. After receiving a relatively thin incident light beam from the coupling-in grating 120, the coupling-out grating 130 functions to expand the pupil in a plane by continuously diffracting and expanding the light beam in two directions in the plane while partially coupling the light out of the waveguide substrate 110, so that the viewer may observe the display information carried by the incident light beam in a relatively larger eyebox.

The coupling-in grating 120 and the coupling-out grating 130 may be located on the same side of the waveguide substrate 110, for example, both disposed on the first surface 111 of the waveguide substrate 110, or may be located on different sides, i.e., on the first surface 111 and the second surface 112, respectively. As a preferred embodiment, the coupling-in region 113 is located on the first surface 111, and the coupling-out region 115 is also located on the first surface 111. As a result, the light-emitting device 20 located on the eye side projects the input light L to the coupling-in region 113 and the input light L is diffracted from the coupling-out region 115 toward the eye.

Figure 2:
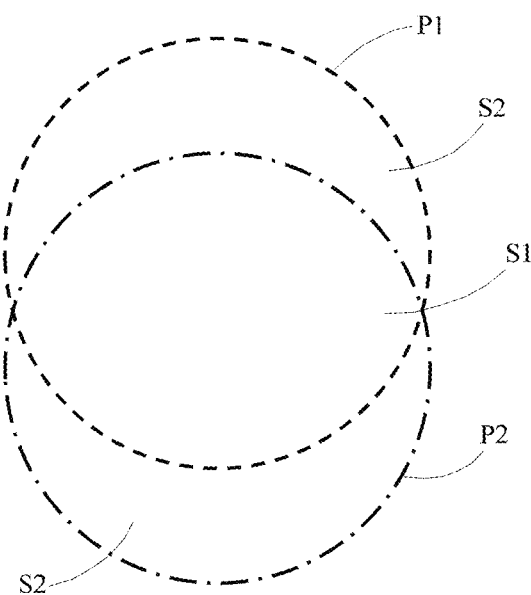
FIG. 2 shows a schematic view of a first profile overlapping a second profile.

In the present disclosure, referring to FIG. 2, the second surface 112 also has a reflection region 114, wherein the light spot of the zero-order diffraction light L0 first projected onto the second surface 112 has a first profile P1, and the first profile P1 is at least partially located in the reflection region 114. The light spot of the positive first-order diffraction light L1 first projected onto the second surface 112 has a second profile P2.

Moreover, the reflection region 114 is provided with a reflection grating 140, which is configured such that the zero-order diffraction light L0 forms positive first-order reflection light L3 through diffraction and the positive first-order reflection light L3 is propagated to the coupling-out grating 130 through total reflection in the waveguide substrate 110. Optionally, the positive first-order reflection light L3 has the same angle as the positive first-order diffraction light L1. In other words, the incident angle of the positive first-order reflection light L3 on the first surface 111 and/or the second surface 112 is equal to the incident angle of the positive first-order diffraction light L1 on the first surface 111 and/or the second surface 112. More specifically, after the zero-order diffraction light L0 hits the reflection grating 140, the reflection grating 140 diffracts the zero-order diffraction light L0 to form several split light (reflected forms) propagating away from the reflection grating 140 and including negative first-order reflection light and the positive first-order reflection light L3. Wherein the positive first-order reflection light L3 propagates in a direction from the coupling-in grating 120 to the coupling-out grating 130 and satisfies the total reflection condition between the first surface 111 and the second surface 112, such that it can propagate to the coupling-out light 130 to be utilized. While the negative first-order reflection light propagates in a direction from the coupling-out grating 130 to the coupling-in grating 120, and cannot propagate to the coupling-out grating 130. Even if it satisfies the total reflection condition, it cannot be utilized. Wherein, the direction from the coupling-out grating 130 to the coupling-in grating 120 and the direction from the coupling-in grating 120 to the coupling-out grating 130 are opposite directions to each other, and they may be collectively referred to as a first direction D1.

The reflection grating 140 may be a one-dimensional grating, such as a linear grating (also referred to as a straight-tooth grating), or may be an oblique-tooth grating, a non-blazed grating, and other suitable types of gratings. The reflection grating 140 may be fabricated by any suitable microfabrication process. For example, the grating may be fabricated on the surface or inside of the waveguide substrate 110 by photolithography or on the waveguide substrate 110 by nanoimprint lithography, thereby forming a surface relief diffraction grating. Alternatively, the reflection grating 140 may also be made separately and then attached to the surface of the waveguide substrate 110.

Wherein, the projection of the reflection region 114 on the first surface 111 at least partially overlaps with the coupling-in region 113, and the ratio of an area of an overlapping portion to an area of the coupling-in region 113 is less than or equal to 40%. As an implementation, the area of the second profile P2 located in the reflection region 114 is less than or equal to 20% of the area of the second profile P2.

In other words, when the area of the second profile P2 located in the reflection region 114 is less than or equal to 20% of the area of the second profile P2, the ratio of the area of the overlapping portion to the area of the coupling-in region 113 is required to be less than or equal to 40%.

After the input light L is projected onto the coupling-in grating 120, the positive first-order diffraction light L1 formed by diffraction is projected onto the first surface 111 after total reflection on the second surface 112, thereafter propagates by total reflection between the first surface 111 and the second surface 112 towards the coupling-out grating 130, and then is coupled out from the coupling-out grating 130. The coupling-in grating 120 projects the zero-order diffraction light L0 formed by the diffraction of the input light L to the reflection grating 140 and diffracts with the reflection grating 140 to form the positive first-order reflection light L3, after which the positive first-order reflection light L3 is projected onto the first surface 111 in the form of reflection, propagates by total reflection between the first surface 111 and the second surface 112 towards the coupling-out grating 130, and then is coupled out from the coupling-out grating 130. As a result, the zero-order diffraction light L0 that would otherwise be emitted from the second surface 112 is reused, thereby improving the coupling-out efficiency of the dense field of view and improving the overall uniformity.

As a preferred embodiment, the second profile P2 is located outside the reflection region 114. As a result, the energy of the original positive first-order diffraction light L1 is not affected by the reflection grating 140 and has the highest coupling efficiency. As an implementation, the ratio of the area of the overlapping portion to the area of the coupling-in region 113 is less than or equal to 20%.

In other words, when the second profile P2 is located outside the reflection region 114, the ratio of the area of the overlapping portion to the area of the coupling-in region 113 is required to be less than or equal to 20%.

TABLE 1

|  | Overlapping ratio of the projection of the reflection grating on the first surface and the coupling-in grating | Coupling-in efficiency | Coupling-out efficiency of dense field of view |
|---|---|---|---|
| Example 1 | 40% | 34.1% | 21.7% |
| Example 2 | 30% | 34.9% | 22.6% |
| Example 3 | 20% | 35.4% | 23.9% |
| Comparative Example 1 | 50% | 31.3% | 19.2% |
| Comparative Example 2 | No reflection grating | 34.5% | 20.3% |

Table 1 shows the change in coupling-out efficiency caused by the overlapping ratio of the projection of the reflection grating 140 on the first surface 111 and the coupling-in grating 120. Wherein, compared to Comparative Example 2 without the reflection grating 140, Comparative Example 1 with the reflection grating 140 results in a decrease in both the coupling-in efficiency and coupling-out efficiency of the dense field of view due to an excessively large overlapping ratio of the projection of the reflection grating 140 on the first surface and the coupling-in grating 120. In Example 1, the projection of the reflection grating 140 on the first surface and the coupling-in grating 120 has the overlapping ratio of 40%. Although its coupling-in efficiency is slightly reduced relative to that in Comparative Example 2, the coupling-out efficiency of the dense field of view is greatly increased relative to Comparative Example 2, which already has implementation value. As the overlapping ratio of the projection of the reflection grating 140 on the first surface and the coupling-in grating 120 gradually decreases to 20%, the coupling-in efficiency and coupling-out efficiency of the dense field of view both increase significantly.

TABLE 2

|  | Ratio of overlapping area of the second profile with the reflection grating | Coupling-in efficiency | Coupling-out efficiency of dense field of view |
|---|---|---|---|
| Example 1 | 20% | 34.1% | 21.9% |
| Example 2 | 10% | 35.4% | 23.1% |
| Example 3 | 0 (The second profile is located outside the reflection region) | 35.8% | 24.3% |
| Comparative Example 1 | 30% | 32.4% | 17.8% |
| Comparative Example 2 | No reflection grating | 34.5% | 20.3% |

Table 2 shows the change in coupling-out efficiency caused by different overlapping areas of the second profile P2 with the reflection grating 140. Wherein, compared to Comparative Example 2 without the reflection grating 140, Comparative Example 1 with the reflection grating 140 results in a decrease in both the coupling-in efficiency and coupling-out efficiency of the dense field of view due to an excessively large ratio of the overlapping area of the second profile P2 with the reflection grating 140. In Example 1, the second profile P2 and the reflection grating 140 has an overlapping area ratio of 20%. Although its coupling-in efficiency is slightly reduced relative to that in Comparative Example 2, the coupling-out efficiency of the dense field of view is greatly increased relative to Comparative Example 2, which already has implementation value. As the overlapping area ratio of the second profile P2 with the reflection grating 140 gradually decreases to 0, the coupling-in efficiency and coupling-out efficiency of the dense field of view both increase significantly.

Obviously, it is preferred that the second profile P2 does not overlap with the reflection grating 140. It is preferred that the overlapping ratio of the projection of the reflection grating 140 on the first surface and the coupling-in grating 120 does not exceed 20%. The best solution is to satisfy at the same time that the second profile P2 does not overlap with the reflection grating 140 and the overlapping ratio of the projection of the reflection grating 140 on the first surface and the coupling-in grating 120 does not exceed 20%, which may effectively improve the coupling-in efficiency and coupling-out efficiency of the dense field of view while achieve the purpose of good global non-uniformity without loss of efficiency.

In order to further explain the impact of the overlapping ratio of the projection of the reflection grating 140 on the first surface 111 and the coupling-in grating on the coupling-out efficiency of the dense field of view, reference is made to FIGS. 3A to 6B.

Figure 3A:
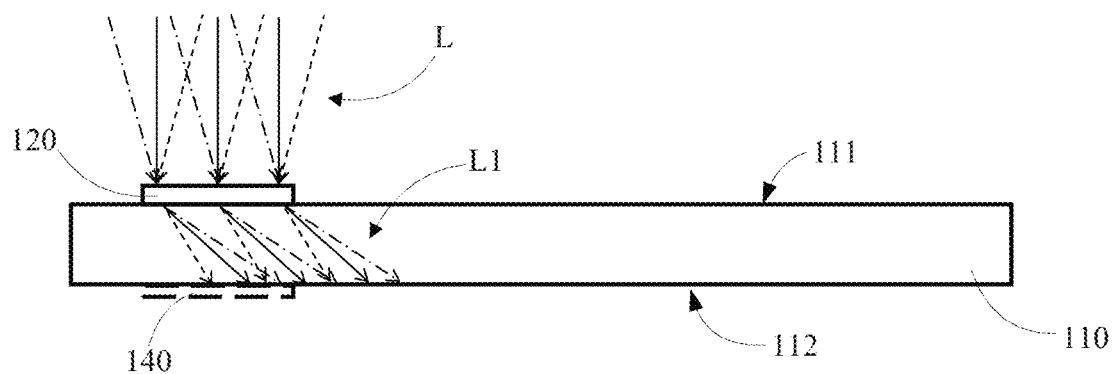
FIGS. 3A and 3B respectively show schematic path views of positive first-order diffraction light and zero-order diffraction light when projection of a reflection grating on a first surface and a coupling-in grating have an overlapping ratio of 100%.
Figure 3B:
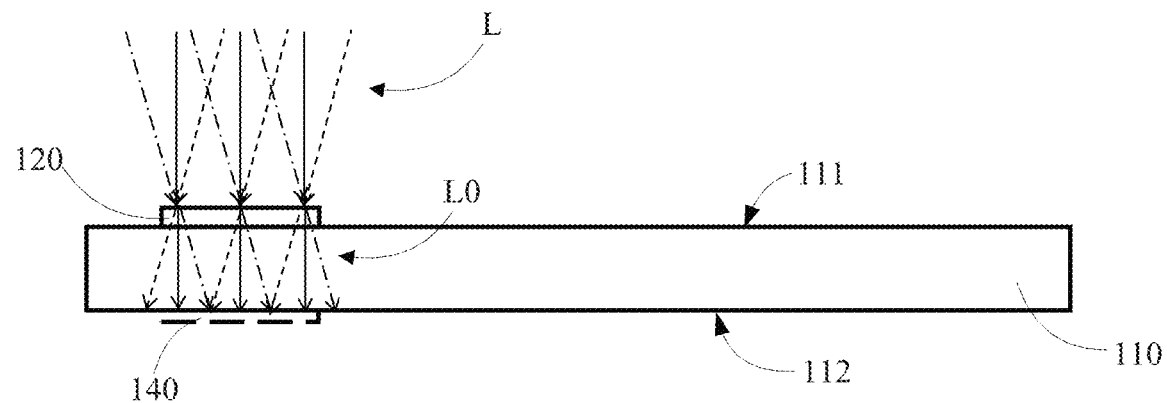

Wherein, FIGS. 3A and 3B respectively show schematic path views of positive first-order diffraction light L1 and zero-order diffraction light L0 when projection of the reflection grating 140 on the first surface 111 and the coupling-in grating have the overlapping ratio of 100%. It may be seen from the figures that when the reflection grating 140 completely corresponds to the coupling-in grating 120, a large amount of positive first-order diffraction light L1 will be projected to the reflection grating 140, resulting in a great loss of energy of the positive first-order diffraction light L1. The recycling gain of the zero-order diffraction light L0 by the reflection grating 140 cannot compensate for the energy loss of the positive first-order diffraction light L1, which is a non-selectable solution.

Figure 4A:
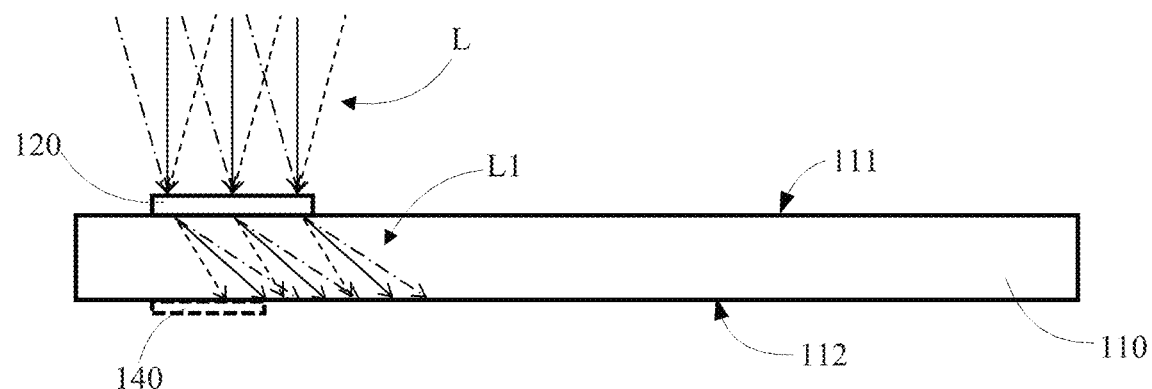
FIGS. 4A and 4B respectively show schematic path views of the positive first-order diffraction light and the zero-order diffraction light when the projection of the reflection grating on the first surface and the coupling-in grating have the overlapping ratio of 60%.
Figure 4B:
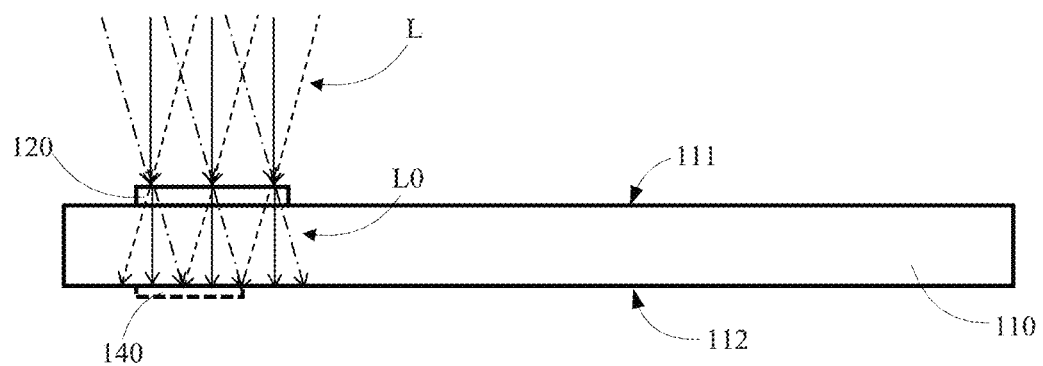

FIGS. 4A and 4B respectively show schematic path views of positive first-order diffraction light L1 and zero-order diffraction light L0 when projection of the reflection grating 140 on the first surface 111 and the coupling-in grating have the overlapping ratio of 60%. Similar to the above, a large part of the positive first-order diffraction light L1 will also be projected to the reflection grating 140. The recycling gain of the zero-order diffraction light L0 by the reflection grating 140 still cannot compensate for the energy loss of the positive first-order diffraction light L1. Therefore, this solution is also not selectable.

Figure 5A:
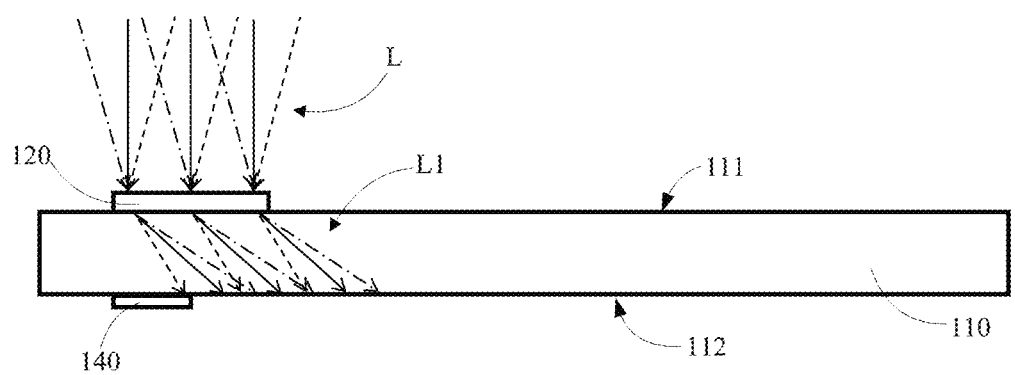
FIGS. 5A and 5B respectively show schematic path views of the positive first-order diffraction light and the zero-order diffraction light when the projection of the reflection grating on the first surface and the coupling-in grating have the overlapping ratio of 40%.
Figure 5B:
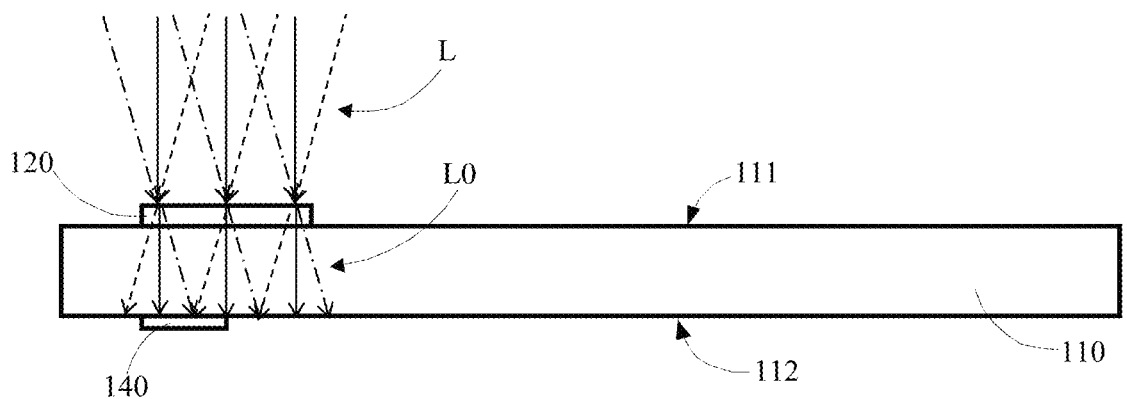

FIGS. 5A and 5B respectively show schematic path views of positive first-order diffraction light L1 and zero-order diffraction light L0 when projection of the reflection grating 140 on the first surface 111 and the coupling-in grating have the overlapping ratio of 40%. When the overlapping ratio is 40%, a smaller ratio of the positive first-order diffraction light L1 will be projected to the reflection grating 140. The recycling gain of the zero-order diffraction light L0 by the reflection grating 140 may compensate for the energy loss of the positive first-order diffraction light L1. Therefore, although a part of the energy of the positive first-order diffraction light L1 is lost, this solution will still improve the coupling-out efficiency of the dense field of view.

Figure 6A:
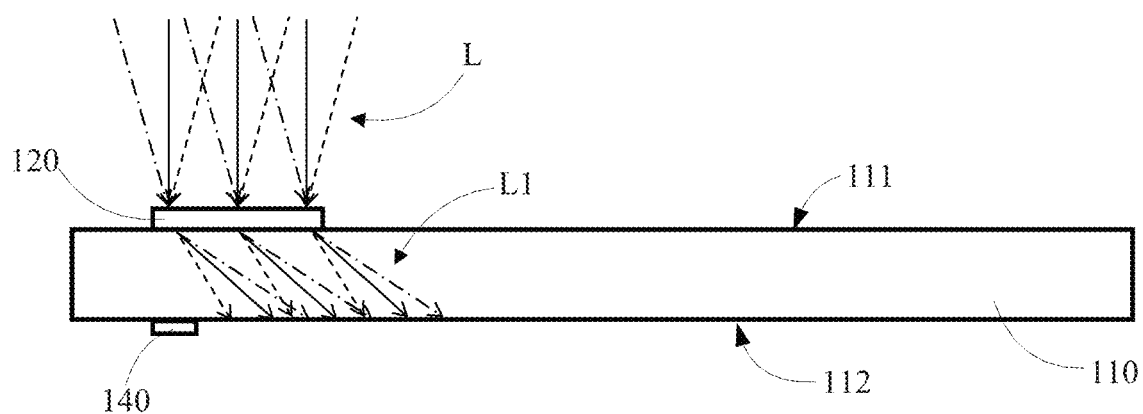
FIGS. 6A and 6B respectively show schematic path views of the positive first-order diffraction light and the zero-order diffraction light when the projection of the reflection grating on the first surface and the coupling-in grating have the overlapping ratio of 20%.
Figure 6B:
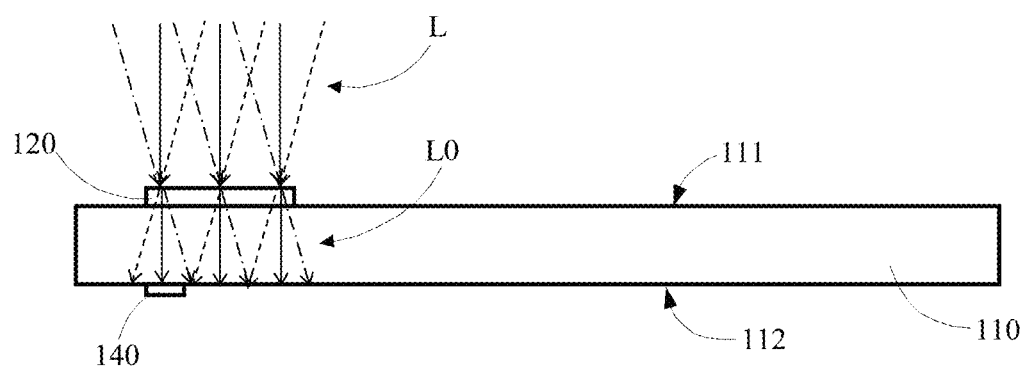

FIGS. 6A and 6B respectively show schematic path views of positive first-order diffraction light L1 and zero-order diffraction light L0 when projection of the reflection grating 140 on the first surface 111 and the coupling-in grating have the overlapping ratio of 20%. In this case, the second profile of the positive first-order diffraction light L1 is completely outside the reflection region 114. In other words, the positive first-order diffraction light L1 will not be projected to the reflection grating 140 at all. The recycling use of the zero-order diffraction light L0 by the reflection grating 140 may all be superimposed to improve the coupling-out efficiency of the dense field of view, which is an optimal solution.

Please refer to FIG. 2 below, the first profile P1 partially overlaps with the second profile P2 such that the first profile P1 includes a non-overlapping region S2 and an overlapping region S1, wherein the non-overlapping region S2 is located within the reflection region 114. In order to utilize energy of the zero-order diffraction light L0 as much as possible, the ratio of the area of the overlapping region S1 to the area of the first profile P1 needs to meet an appropriate range.

As an optional embodiment, the ratio of the area of the overlapping region S1 to the area of the first profile P1 is less than or equal to 80%, and the ratio of the area of the overlapping region S1 to the area of the second profile P2 is less than or equal to 80%. Within the above range, the smaller the ratio of the area of the overlapping region S1 to the area of the first profile P1 and/or the second profile P2, the more favorable it is to utilize the energy of the zero-order diffraction light L0.

However, in practice, the maximum available range of the above-mentioned ratio has a correlation with the thickness L of the waveguide substrate 110. Wherein, the thickness L of the waveguide substrate 110 may refer to the size of the waveguide substrate 110 in a direction substantially perpendicular to the first surface 111 and the second surface 112.

More specifically, the light spot of the positive first-order diffraction light L1 and the light spot of the zero-order diffraction light L0 are generally circular or approximately circular ellipses. In other words, the first profile P1 and the second profile P2 are circles with a diameter D or ellipses with a minor axis D.

Wherein when L is 0.5 mm<L≤0.75 mm, the ratio of the area of the overlapping region S2 to the area of the first profile P1 and/or the second profile P2 is preferably less than or equal to 80%. Moreover, the distance from a geometric center of the second profile P2 to a side of the reflection grating 140 closest to the geometric center is greater than (D/2)×0.8.

When L is 0.75 mm<L≤1.0 mm, the ratio of the area of the overlapping region S2 to the area of the first profile P1 and/or the second profile P2 is less than 75%. Moreover, the distance from the geometric center of the second profile P2 to the side of the reflection grating 140 closest to the geometric center is greater than (D/2)×0.72.

When L is 1.0 mm<L≤1.5 mm, the ratio of the area of the overlapping region S2 to the area of the first profile P1 and/or the second profile P2 is preferably less than 70%. Moreover, the distance from the geometric center of the second profile P2 to the side of the reflection grating 140 closest to the geometric center is greater than (D/2)×0.65.

When L is 1.5 mm<L≤2.0 mm, the ratio of the area of the overlapping region S2 to the area of the first profile P1 and/or the second profile P2 is preferably less than 65%. Moreover, the distance from the geometric center of the second profile P2 to the side of the reflection grating 140 closest to the geometric center is greater than (D/2)×0.5.

Furthermore, the waveguide substrate 110 has a first refractive index $n_1$, and the coupling-in grating 120 has a second refractive index $n_2$, where $0 \leq n_2 - n_1 \leq 0.4$. Optionally, $0 \leq n_2 - n_1 \leq 0.2$. The mating scheme of the high refractive index of the coupling-in grating 120 and the low refractive index of the waveguide substrate 110 enables the first profile P1 and the second profile P2 to be further spaced apart. In other words, the area ratio of the overlapping region S1 is reduced, and thereby the area ratio of the first profile P1 in the reflection region 114 is larger, which is conducive to better utilization of the energy of the zero-order diffraction light L0.

The shape of the coupling-in region 113 is circular, elliptical, square or rectangular. The area of the coupling-in region 113 is less than or equal to 144 $mm^2$. Exemplarily, when the shape of the coupling-in region 113 is square, the side length of the coupling-in region 113 is less than or equal to 12 mm, and its area is less than or equal to 144 $mm^2$. When the shape of the coupling-in region 113 is circular, its radius is less than or equal to 6 mm, and its area is less than or equal to 115 $mm^2$.

Optionally, the area of the coupling-in region 113 is less than or equal to 64 $mm^2$. Exemplarily, when the shape of the coupling-in region 113 is square, the side length of the coupling-in region 113 is less than or equal to 8 mm, and its area is less than or equal to 64 $mm^2$. When the shape of the coupling-in region 113 is circular, its radius is less than or equal to 4 mm, and its area is less than or equal to 51 $mm^2$. By reducing the area of the coupling-in grating 120, the number of times that the light from the dense field of view is reflected to the coupling-in grating 120 may be reduced, and the energy loss may be reduced.

As an optional embodiment, the coupling-in grating 120 and the reflection grating 140 have the same period. The coupling-in grating 120 and the reflection grating 140 have different duty cycles.

In the present disclosure, the coupling-in grating 120 needs to take into account the energy and reflection efficiency of the positive first-order diffraction light L1, while the reflection grating 140 only needs to pay attention to the energy of the zero-order diffraction light L0. Therefore, the coupling efficiency of the reflection grating 140 to the positive first-order diffraction light L1 is greater than the coupling efficiency of the coupling-in grating 120 to the input light L.

Figure 8A:
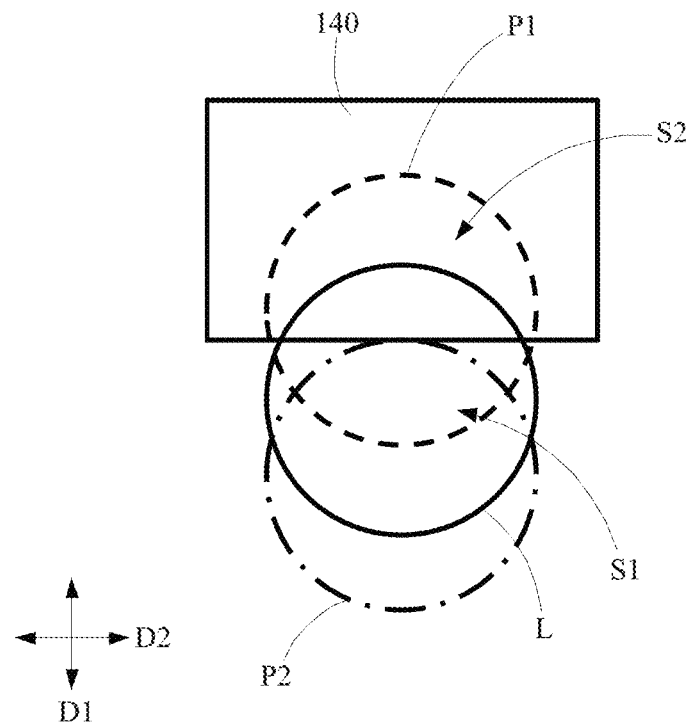
FIGS. 8A, 8B and 8C show schematic views of different shapes of reflection regions.
Figure 8B:
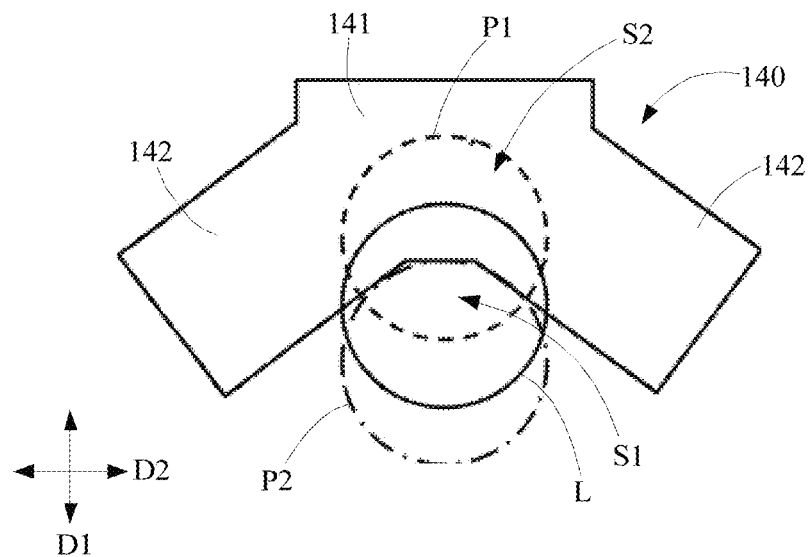
Figure 8C:
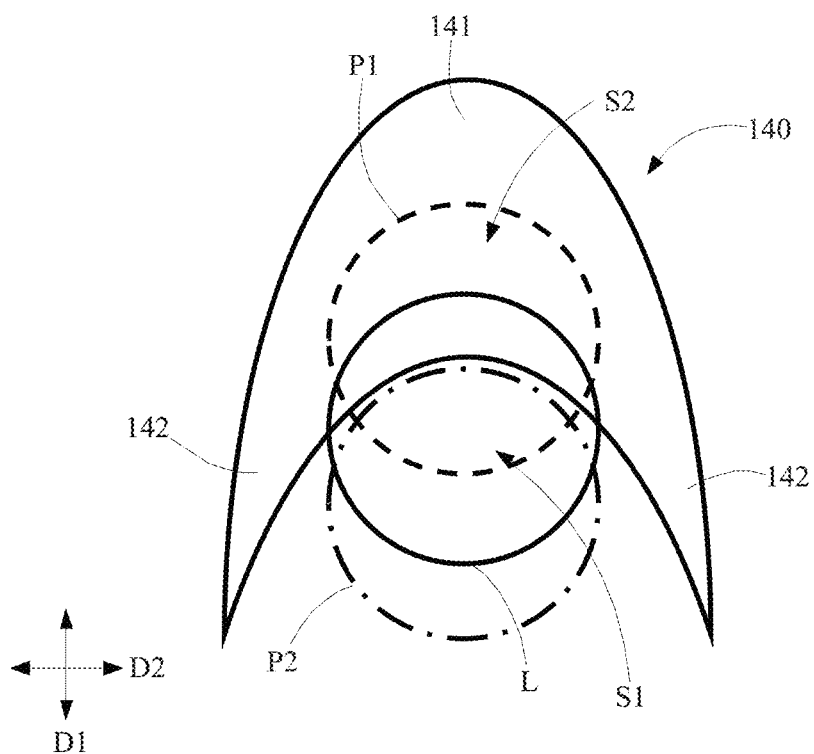

The shape of the reflection grating 140 or the reflection region 114 may be circular, rectangular (shown in FIG. 8A), etc. In order to further enlarge the area of the reflection grating 140 that may contact the zero-order diffraction light L0, the shape of the reflection grating 140 or the reflection region 114 may also be a butterfly shape as shown in FIG. 8B or a crescent shape as shown in FIG. 8C, or the like. Wherein, in addition to having a main body portion 141 disposed in a middle portion and overlapping a large portion of the first profile P1, the butterfly-shaped reflection grating 140 shown in FIG. 8B and the crescent-shaped reflection grating 140 shown in FIG. 8C further have extension portions 142 disposed on both sides of the main body portion 141 along the first direction D1.

Figure 7A:
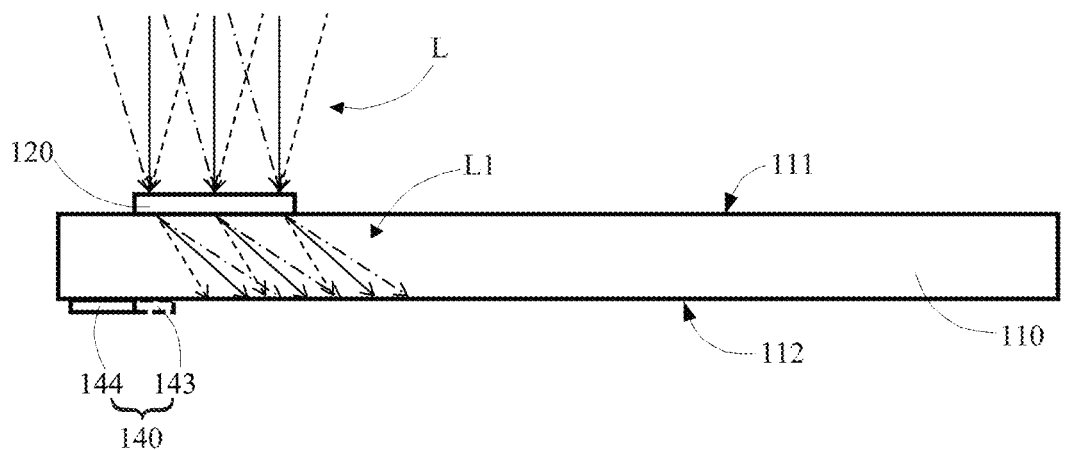
FIGS. 7A and 7B respectively show schematic views of the reflection grating beyond the coverage range of the coupling-in grating.
Figure 7B:
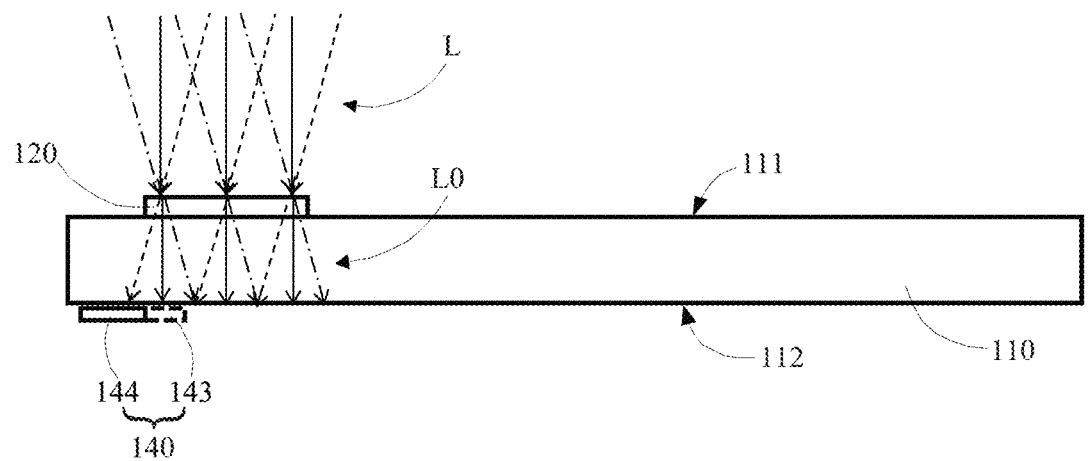

It is worth mentioning that the projection of the reflection region 114 on the first surface 111 may be entirely within the range of the coupling-in region 113, that is, the reflection grating 140 is completely covered by the coupling-in grating 120 in the thickness direction of the waveguide substrate 110. However, the projection of the reflection region 114 on the first surface 111 may also be partially outside the range of the coupling-in region 113. In other words, the reflection grating 140 is not completely covered by the coupling-in grating 120 in the thickness direction of the waveguide substrate 110. The reflection grating 140 as shown in FIGS. 7A and 7B extends beyond the coverage of the coupling-in grating 120 in the first direction D1. Specifically, the reflection grating 140 includes a first part 143 and a second part 144, wherein the projection of the first part 143 on the first surface 111 is located within the range of the coupling-in region 113, and the projection of the second part 144 on the first surface 111 is located outside the range of the coupling-in region 113.

Optionally, the reflection grating 140 may also extend beyond the coverage range of the coupling-in grating 120 in a second direction D2. Wherein, the plane formed by intersection of the first direction D1 and the second direction D2 is substantially parallel to the first surface 111, and the second direction D2 is orthogonal to the first direction D1. As mentioned above, the first direction D1 is a general term for the direction from the coupling-in grating 120 to the coupling-out grating 130 and the direction from the coupling-out grating 130 to the coupling-in grating 120. For convenience of description, the direction from the coupling-in grating 120 to the coupling-out grating 130 may be referred to as the positive direction, and the direction from the coupling-out grating 130 to the coupling-in grating 120 may be referred to as the negative direction.

More specifically, the reflection grating 140 extending beyond the coverage of the coupling-in grating 120 in the first direction D1 means that the reflection grating 140 extends beyond the coverage of the coupling-in grating 120 in the direction from the coupling-out grating 130 to the coupling-in grating 120 (i.e., the negative direction).

Optionally, the size of the portion of the reflection grating 140 extending beyond the coverage of the coupling-in grating 120 in the negative direction does not exceed twice the size of the first part 143, or in other words, the size of the second part 144 in the first direction D1 is less than or equal to twice the size of the first part 143 in the first direction D1.

Further optionally, the size of the portion of the reflection grating 140 extending beyond the coverage of the coupling-in grating 120 in the negative direction does not exceed one time the size of the first part 143, or in other words, the size of the second part 144 in the first direction D1 is less than or equal to the size of the first part 143 in the first direction D1.

The reflection grating 140 extending beyond the coverage of the coupling-in grating 120 in the direction from the coupling-out grating 130 to the coupling-in grating 120 is helpful for production and processing, and therefore has a beneficial effect on improving yield and production efficiency. In addition, the reflection grating 140 extending beyond the coverage of the coupling-in grating 120 in the direction from the coupling-out grating 130 to the coupling-in grating 120 also helps to collect the zero-order diffraction light L0 formed by diffraction of the incident light of various field of view angles by the coupling-in grating 120 and to form the positive first-order reflection light L3 by diffraction, thereby realizing the maximized utilization of the zero-order diffraction light L0.

A second aspect of the present disclosure provides a display device 10 including the aforementioned optical waveguide device 100 and the light-emitting device 20. The light-emitting device 20 may project the input light L to the optical waveguide device 100, e.g., project the input light L within a predetermined field of view to the region of the optical waveguide device 100 where the coupling-in grating 120 is located.

The display device 10 may be an augmented reality display device 10 or a virtual reality display device 10. Wherein, the augmented reality display device 10 includes but is not limited to the devices such as an Augmented Reality (AR) glasses, an in-vehicle Head-Up Display (HUD), or the like.

Figure 9:
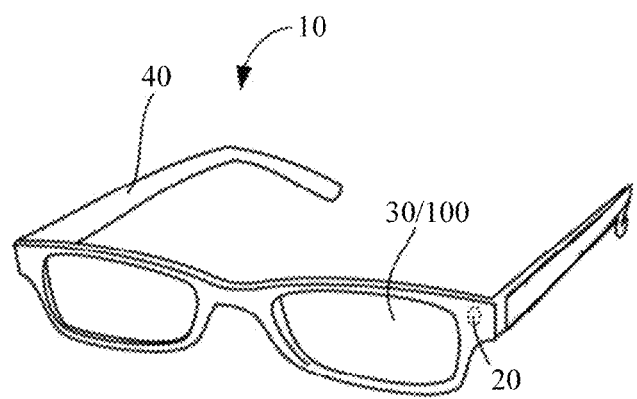
FIG. 9 shows a schematic view of a display device according to an embodiment of the present disclosure.

As an example, referring to FIG. 9, the display device 10 may be a near-eye display device 10, which may include a lens 30 and a frame 40 for holding the lens 30 near eyes. Wherein, the frame 40 may be provided with the above-mentioned light-emitting device 20, and the lens 30 may include the optical waveguide device 100.

The light-emitting device 20 may be a micro display such as a Laser Beam Scanning (LBS), a Digital Light Procession (DLP), a Digital Micromirror Device (DMD), a Liquid Crystal on Silicon (LCOS), a Micro Electro Mechanical System (MEMS), an Organic Light Emitting Diode (OLED), a Micro LED light emitting device, or the like. The light emitted by the light-emitting device 20 is visible light.

As an optional embodiment, the display device 10 may also include an actuating device for actuating the light-emitting device 20 to project the input light L onto the coupling-in grating 120 of the optical waveguide device 100. Wherein the actuating device may include an actuating circuit, which may include a MOSFET, a capacitor, a resistor or other suitable components. The display device 10 may further comprise a controller that is electrically connectable to the actuating circuit. The actuating device is controlled via the controller to actuate the light-emitting device 20 to project input light L onto the coupling-in grating 120 of the optical waveguide device 100.

As an implementation, a value of the predetermined field of view of the input light L projected by the light-emitting device 20 along the first direction is V, and the value of the predetermined field of view along the second direction is H. Optionally, when the display device 10 is worn on the eyes, the first direction D1 may be a horizontal direction, and the second direction D2 may be a vertical direction.

Figure 10A:
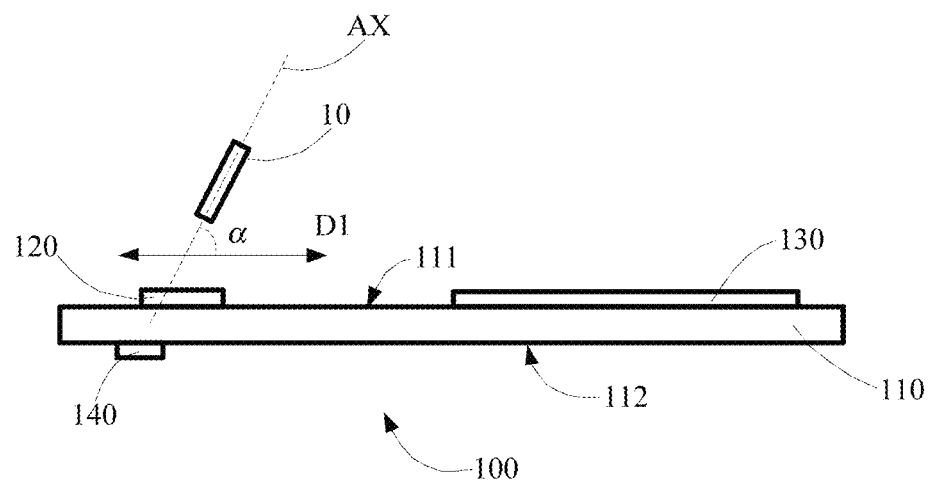
FIG. 10A shows an included angle between an optical axis of a light-emitting device and a first direction.
Figure 10B:
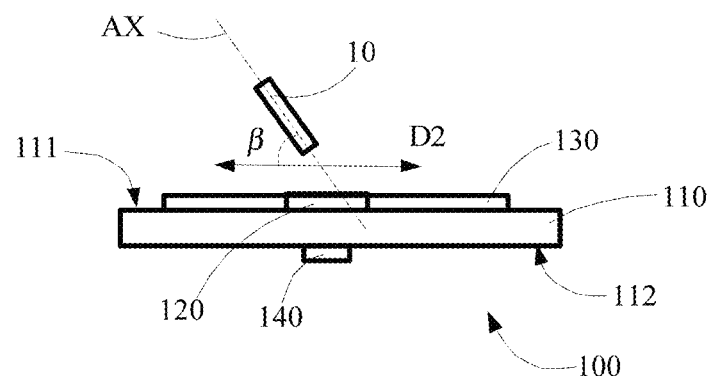
FIG. 10B shows an included angle between the optical axis of the light-emitting device and a second direction.

An included angle between an optical axis AX of the light-emitting device 20 and the first direction D1 is α, which may refer to FIG. 10A. An included angle between the optical axis AX of the light-emitting device 20 and the second direction D2 is β, which may refer to FIG. 10B. For example, FIGS. 11A, 11B, 11C and 11D show the influence of the deflection angle of the optical axis AX of the light-emitting device 20 on the position of the light spot of the input light L. Wherein, the outer circle represents the coupling-in grating 120, and the inner circle represents the light beam of the input light L. In the figures, the light spots of the coupling-in grating 120 and the input light L are circular as an example, and in actual applications, they may be slightly elliptical in shape.

Figure 11A:
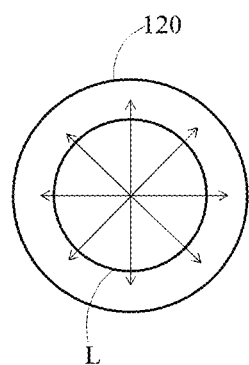
FIGS. 11A, 11B, 11C and 11D show schematic views of input light reaching the coupling-in grating when the light-emitting device has different deflection angles.

In FIG. 11A, the optical axis AX of the light-emitting device 20 is perpendicular to the coupling-in grating 120, that is, α and β are both 0. At this time, the light spot of the input light L is located in the center of the coupling-in grating 120. In other words, the light-emitting device 20 is directly incident on the coupling-in grating 120.

Figure 11B:
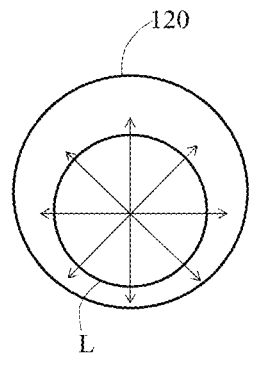

In FIG. 11B, the optical axis AX of the light-emitting device 20 has an included angle with the coupling-in grating 120. Specifically, α is 0, and β is not 0. At this time, the light spot of the input light L is slightly vertically offset relative to the center of the coupling-in grating 120. In other words, the light-emitting device 20 is incident upward or downward into the coupling-in grating 120.

Figure 11C:
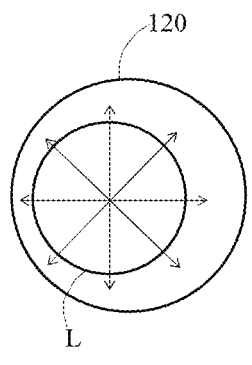

In FIG. 11C, the optical axis AX of the light-emitting device 20 has an included angle with the coupling-in grating 120. Specifically, α is not 0, and β is 0. At this time, the light spot of the input light L is slightly horizontally offset relative to the center of the coupling-in grating 120. In other words, the light-emitting device 20 is incident to the left or right into the coupling-in grating 120.

Figure 11D:
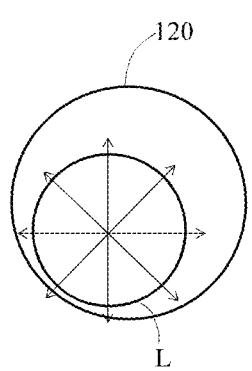

In FIG. 11D, the optical axis AX of the light-emitting device 20 has an included angle with the coupling-in grating 120. Specifically, neither α nor β is 0. At this time, the light spot of the input light L is slightly tilted relative to the center of the coupling-in grating 120. In other words, the light-emitting device 20 is obliquely incident into the coupling-in grating 120.

The sampling interval along the first direction D1 is h, the sampling interval along the second direction D2 is v, the number of sampling points is c, H=c×h, and V=c×v.

A light ray of the light spot of the input light L projected onto the first surface 111 at an edge vertex along the first direction D1 and the first surface 111 have an included angle of $k_1 \times h + \alpha$, where $0 < k_1 < c$. A light ray of the light spot of the input light L projected onto the first surface 111 at an edge vertex along the second direction D2 and the first surface 111 have an included angle of $k_2 \times v + \beta$, where $0 < k_2 < c$.

The shape of the light spot may be adjusted by adjusting the values of $k_1$ and $k_2$. For example, the light spot may be adjusted into rectangular, circular, elliptical, etc.

The wavelength of the input light L is λ, and the period of the coupling-in grating 120 is d.

Wherein the diffraction angle of the positive first-order diffraction light L1 is expressed in the spherical coordinate system as:

$$\theta_1 = \arcsin\left(\frac{1}{n_2} \times \sqrt{\left(\sin(k_1 \times h + \alpha) \times \cos(k_2 \times v + \beta) + \frac{\lambda}{d}\right)^2 + \left(\sin(k_1 \times h + \alpha) \times \sin(k_2 \times v + \beta) + \frac{\lambda}{d}\right)^2}\right),$$

$$\varphi_1 = \arctan2\left(\sin(k_1 \times h + \alpha) \times \sin(k_2 \times v + \beta) + \frac{\lambda}{d}, \sin(k_1 \times h + \alpha) \times \cos(k_2 \times v + \beta) + \frac{\lambda}{d}\right);$$

The diffraction angle of the zero-order diffraction light L0 is expressed in the spherical coordinate system as:

$$\theta_0 = \arcsin\left(\frac{1}{n_2} \times \sqrt{\left(\sin(k_1 \times h + \alpha) \times \cos(k_2 \times v + \beta)\right)^2 + \left(\sin(k_1 \times h + \alpha) \times \sin(k_2 \times v + \beta)\right)^2}\right),$$

$$\varphi_0 = \arctan2(\sin(k_1 \times h + \alpha) \times \sin(k_2 \times v + \beta), \sin(k_1 \times h + \alpha) \times \cos(k_2 \times v + \beta)).$$

With the above formula, the region of the reflection grating 140, or the reflection region 114, may be limited to an appropriate range.

It should be noted that the above-described embodiments are intended to illustrate but not limit the present disclosure, and those skilled in the art will be able to design alternative embodiments without departing from the scope of the appended claims. In the claims, any reference signs in parentheses shall not be construed as limiting the claim. The disclosure can be implemented by means of hardware including several different elements as well as by means of a suitably programmed computer. In a unit claim listing several devices, some of these devices can be presented by the same one of hardware. The use of the words, such as first, second, and third, does not denote any order. These words can be interpreted as terms.

As discussed above with reference to the illustration of the figures, the followings are provided in this application:
(1) An optical waveguide device, comprising:
    a waveguide substrate having a first surface with a coupling-in region and an opposite second surface with a reflecting region, and further having a coupling-out region;
    a coupling-in grating disposed in the coupling-in region of the first surface of the waveguide substrate and configured to receive input light within a predetermined field of view, diffract at least a portion of the input light to form positive first-order diffraction light and zero-order diffraction light, and couple the light into the waveguide substrate, such that the light can propagate within the waveguide substrate through total reflection, wherein a light spot of the zero-order diffraction light first projected onto the second surface has a first profile, and the first profile is at least partially located in the reflection region;
    a coupling-out grating disposed in the coupling-out region of the waveguide substrate and configured to couple at least a portion of the light propagating into the coupling-out grating out of the waveguide substrate through diffraction;
    a reflection grating disposed in the reflection region of the second surface and configured such that a portion of the zero-order diffraction light forms positive first-order reflection light through diffraction and the positive first-order reflection light is propagated to the coupling-out grating through total reflection in the waveguide substrate;
    wherein a projection of the reflection region on the first surface at least partially overlaps with the coupling-in region, and a ratio of an area of an overlapping portion to an area of the coupling-in region is less than or equal to 40%.
(2) The optical waveguide device of item (1), wherein the ratio of the area of the overlapping portion to the area of the coupling-in region is less than or equal to 20%.
(3) The optical waveguide device of item (1), wherein an incident angle of the positive first-order reflection light on the first surface and/or the second surface is equal to an incident angle of the positive first-order diffraction light on the first surface and/or the second surface.

(4) The optical waveguide device of item (1), wherein a projection of the reflection grating on the first surface is located within the range of the coupling-in region.

(5) The optical waveguide device of item (1), wherein the reflection grating comprises a first part and a second part, a projection of the first part on the first surface is located within the range of the coupling-in region, a projection of the second part on the first surface is located outside the range of the coupling-in region, and a length of the second part along a first direction is less than or equal to twice a length of the first part along the first direction.

(6) The optical waveguide device of item (5), wherein the length of the second part along the first direction is less than or equal to the length of the first part along the first direction.

(7) The optical waveguide device of item (1), wherein a light spot of the positive first-order diffraction light first projected onto the second surface has a second profile, and an area of the second profile located in the reflection region is less than or equal to 20% of an area of the second profile.

(8) The optical waveguide device of item (7), wherein the second profile is located outside the reflection region.

(9) The optical waveguide device of item (7), wherein the first profile partially overlaps with the second profile such that the first profile comprises a non-overlapping region and an overlapping region, wherein the non-overlapping region is located within the reflection region.

(10) The optical waveguide device of item (9), wherein, the first profile and the second profile are circles with a diameter D or ellipses with a minor axis D, and the waveguide substrate has a thickness of L;
wherein when L is 0.5 mm<L≤0.75 mm, a ratio of an area of the overlapping region to an area of the first profile and/or the second profile is less than or equal to 80%.

(11) The optical waveguide device of item (10), wherein a distance from a geometric center of the second profile to a side of the reflection grating closest to the geometric center is greater than (D/2)×0.8.

(12) The optical waveguide device of item (10), wherein when L is 0.75 mm<L≤1.0 mm, a ratio of an area of the overlapping region to an area of the first profile and/or the second profile is less than 75%.

(13) The optical waveguide device of item (12), wherein a distance from a geometric center of the second profile to a side of the reflection grating closest to the geometric center is greater than (D/2)×0.72.

(14) The optical waveguide device of item (10), wherein when L is 1.0 mm<L≤1.5 mm, a ratio of an area of the overlapping region to an area of the first profile and/or the second profile is less than 70%.

(15) The optical waveguide device of item (14), wherein a distance from a geometric center of the second profile to a side of the reflection grating closest to the geometric center is greater than (D/2)×0.65.

(16) The optical waveguide device of item (10), wherein when L is 1.5 mm<L≤2.0 mm, a ratio of an area of the overlapping region to an area of the first profile and/or the second profile is less than 65%.

(17) The optical waveguide device of item (16), wherein a distance from a geometric center of the second profile to a side of the reflection grating closest to the geometric center is greater than (D/2)×0.5.

(18) The optical waveguide device of any one of items (1) to (17), wherein the waveguide substrate has a first refractive index $n_1$, and the coupling-in grating has a second refractive index $n_2$, wherein $0 \leq n_2 - n_1 \leq 0.4$.

(19) The optical waveguide device of item (18), wherein $0 \leq n_2 - n_1 \leq 0.2$.

(20) The optical waveguide device of any one of items (1) to (17), wherein,
an area of the coupling-in region is less than or equal to 144 mm$^2$; and/or
a shape of the coupling-in region is circular, elliptical, square or rectangular.

(21) The optical waveguide device of item (20), wherein the area of the coupling-in region is less than or equal to 64 mm$^2$.

(22) The optical waveguide device of any one of items (1) to (17), wherein,
the coupling-in grating and the reflection grating have the same period; and/or
the coupling-in grating and the reflection grating have different duty cycles.

(23) The optical waveguide device of any one of items (1) to (17), wherein a coupling efficiency of the reflection grating to the positive first-order diffraction light is greater than a coupling efficiency of the coupling-in grating to the input light.

(24) A display device, comprising:
the optical waveguide device of any one of items (1) to (23); and
a light-emitting device configured to emit input light within a predetermined field of view to a coupling-in grating of the optical waveguide device.

(25) The display device of item (24), wherein,
a value of the predetermined field of view along a first direction is V, a value of the predetermined field of view along a second direction is H, the second direction is orthogonal to the first direction, and a plane formed by intersection of the first direction and the second direction is substantially parallel to the first surface;
an included angle between an optical axis of the light-emitting device and the first direction is α, and an included angle between the optical axis of the light-emitting device and the second direction is β;
a sampling interval along the first direction is h, a sampling interval along the second direction is v, the number of sampling points is c, H=c×h, and V=c×v;
wherein a light ray of a light spot of the input light projected onto the first surface at an edge vertex along the first direction and the first surface have an included angle of $k_1 \times h + \alpha$, where $0 < k_1 < c$;
a light ray of the light spot of the input light projected onto the first surface at an edge vertex along the second direction and the first surface have an included angle of $k_2 \times v + \beta$, where $0 < k_2 < c$; and
a shape of the light spot can be adjusted by adjusting values of $k_1$ and $k_2$.

What is claimed is:
1. An optical waveguide device, comprising:
a waveguide substrate having a first surface with a coupling-in region and an opposite second surface with a reflecting region, and further having a coupling-out region;
a coupling-in grating disposed in the coupling-in region of the first surface of the waveguide substrate and configured to receive input light within a predetermined field of view, diffract at least a portion of the input light to form positive first-order diffraction light and zero-order diffraction light, and couple the light into the waveguide substrate, such that the light can propagate within the waveguide substrate through total reflection, wherein a light spot of the zero-order diffraction light first projected onto the second surface has a first profile, and the first profile is at least partially located in the reflection region;

a coupling-out grating disposed in the coupling-out region of the waveguide substrate and configured to couple at least a portion of the light propagating into the coupling-out grating out of the waveguide substrate through diffraction;

a reflection grating disposed in the reflection region of the second surface and configured such that a portion of the zero-order diffraction light forms positive first-order reflection light through diffraction and the positive first-order reflection light is propagated to the coupling-out grating through total reflection in the waveguide substrate;

wherein a projection of the reflection region on the first surface at least partially overlaps with the coupling-in region, and a ratio of an area of an overlapping portion to an area of the coupling-in region is less than or equal to 40%.

2. The optical waveguide device of claim 1, wherein the ratio of the area of the overlapping portion to the area of the coupling-in region is less than or equal to 20%.

3. The optical waveguide device of claim 1, wherein an incident angle of the positive first-order reflection light on the first surface and/or the second surface is equal to an incident angle of the positive first-order diffraction light on the first surface and/or the second surface.

4. The optical waveguide device of claim 1, wherein a projection of the reflection grating on the first surface is located within the range of the coupling-in region.

5. The optical waveguide device of claim 1, wherein the reflection grating comprises a first part and a second part, a projection of the first part on the first surface is located within the range of the coupling-in region, a projection of the second part on the first surface is located outside the range of the coupling-in region, and a length of the second part along a first direction is less than or equal to twice a length of the first part along the first direction.

6. The optical waveguide device of claim 5, wherein the length of the second part along the first direction is less than or equal to the length of the first part along the first direction.

7. The optical waveguide device of claim 1, wherein a light spot of the positive first-order diffraction light first projected onto the second surface has a second profile, and an area of the second profile located in the reflection region is less than or equal to 20% of an area of the second profile.

8. The optical waveguide device of claim 7, wherein the second profile is located outside the reflection region.

9. The optical waveguide device of claim 7, wherein the first profile partially overlaps with the second profile such that the first profile comprises a non-overlapping region and an overlapping region, wherein the non-overlapping region is located within the reflection region.

10. The optical waveguide device of claim 9, wherein, the first profile and the second profile are circles with a diameter D or ellipses with a minor axis D, and the waveguide substrate has a thickness of L;

wherein L is 0.5 mm<L≤2.0 mm, and wherein when L is 0.5 mm<L≤0.75 mm, a ratio of an area of the overlapping region to an area of the first profile and/or the second profile is less than or equal to 80%;

wherein when L is 0.75 mm<L≤1.0 mm, a ratio of an area of the overlapping region to an area of the first profile and/or the second profile is less than 75%;

wherein when L is 1.0 mm<L≤1.5 mm, a ratio of an area of the overlapping region to an area of the first profile and/or the second profile is less than 70%; and wherein when L is 1.5 mm<L≤2.0 mm, a ratio of an area of the overlapping region to an area of the first profile and/or the second profile is less than 65%.

11. The optical waveguide device of claim 10, wherein when L is 0.5 mm<L≤0.75 mm, a distance from a geometric center of the second profile to a side of the reflection grating closest to the geometric center is greater than (D/2)×0.8.

12. The optical waveguide device of claim 10, wherein when L is 0.75 mm<L≤1.0 mm, a distance from a geometric center of the second profile to a side of the reflection grating closest to the geometric center is greater than (D/2)×0.72.

13. The optical waveguide device of claim 10, wherein when L is 1.0 mm<L≤1.5 mm, a distance from a geometric center of the second profile to a side of the reflection grating closest to the geometric center is greater than (D/2)×0.65.

14. The optical waveguide device of claim 10, wherein when L is 1.5 mm<L≤2.0 mm, a distance from a geometric center of the second profile to a side of the reflection grating closest to the geometric center is greater than (D/2)×0.5.

15. The optical waveguide device of claim 1, wherein the waveguide substrate has a first refractive index $n_1$, and the coupling-in grating has a second refractive index $n_2$, wherein $0 \leq n_2 - n_1 \leq 0.4$.

16. The optical waveguide device of claim 1, wherein, an area of the coupling-in region is less than or equal to 144 mm$^2$; and/or a shape of the coupling-in region is circular, elliptical, square or rectangular.

17. The optical waveguide device of claim 1, wherein, the coupling-in grating and the reflection grating have the same period; and/or the coupling-in grating and the reflection grating have different duty cycles.

18. The optical waveguide device of claim 1, wherein a coupling efficiency of the reflection grating to the positive first-order diffraction light is greater than a coupling efficiency of the coupling-in grating to the input light.

19. A display device, comprising:

the optical waveguide device of claim 1; and a light-emitting device configured to emit input light within a predetermined field of view to a coupling-in grating of the optical waveguide device.

20. The display device of claim 19, wherein, a value of the predetermined field of view along a first direction is V, a value of the predetermined field of view along a second direction is H, the second direction is orthogonal to the first direction, and a plane formed by intersection of the first direction and the second direction is substantially parallel to the first surface;

an included angle between an optical axis of the light-emitting device and the first direction is α, and an included angle between the optical axis of the light-emitting device and the second direction is β;

a sampling interval along the first direction is h, a sampling interval along the second direction is v, the number of sampling points is c, H=c×h, and V=c×v;

wherein a light ray of a light spot of the input light projected onto the first surface at an edge vertex along the first direction and the first surface have an included angle of $k_1 \times h + \alpha$, where $0 < k_1 < c$;

a light ray of the light spot of the input light projected onto the first surface at an edge vertex along the second direction and the first surface have an included angle of $k_2 \times v + \beta$, where $0 < k_2 < c$; and a shape of the light spot can be adjusted by adjusting values of $k_1$ and $k_2$.

* * * * *